(12) United States Patent
Nakayama et al.

(10) Patent No.: US 11,738,502 B2
(45) Date of Patent: Aug. 29, 2023

(54) FILAMENT FOR THREE-DIMENSIONAL MODELING

(71) Applicant: FUJIFILM BUSINESS INNOVATION CORP., Tokyo (JP)

(72) Inventors: Daisuke Nakayama, Kanagawa (JP);
Taichi Yamada, Kanagawa (JP);
Kentaro Ageishi, Kanagawa (JP);
Masayuki Ookoshi, Kanagawa (JP);
Jiro Minabe, Kanagawa (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 92 days.

(21) Appl. No.: 16/983,099

(22) Filed: Aug. 3, 2020

(65) Prior Publication Data

US 2021/0245422 A1 Aug. 12, 2021

(30) Foreign Application Priority Data

Feb. 10, 2020 (JP) ................................. 2020-020649

(51) Int. Cl.
| | | |
|---|---|---|
| *B29C 64/118* | (2017.01) | |
| *B29C 64/295* | (2017.01) | |
| *B29C 64/205* | (2017.01) | |
| *D01F 6/06* | (2006.01) | |
| *B29K 23/00* | (2006.01) | |
| *B33Y 30/00* | (2015.01) | |

(Continued)

(52) U.S. Cl.
CPC .......... *B29C 64/118* (2017.08); *B29C 64/205* (2017.08); *B29C 64/295* (2017.08); *D01F 6/06* (2013.01); *B29K 2023/12* (2013.01); *B29K 2995/0097* (2013.01); *B33Y 10/00* (2014.12); *B33Y 30/00* (2014.12); *B33Y 70/00* (2014.12); *Y10T 428/2931* (2015.01)

(58) Field of Classification Search
CPC ......... B33Y 10/00; B33Y 30/00; B33Y 70/00; B33Y 70/10; B33Y 80/00; D01F 8/00; D01F 8/04; D01F 6/06; D01F 8/06; D01F 8/12; D01F 8/14; D01F 8/18; B29C 64/00; B29C 64/115; Y10T 428/2929; Y10T 428/2931; B29K 2023/12; B29K 2995/0097
USPC ........ 442/199, 201, 311, 361, 363; 428/357, 428/402, 373, 374
See application file for complete search history.

(56) References Cited

U.S. PATENT DOCUMENTS

| | | | |
|---|---|---|---|
| 2010/0233458 A1* | 9/2010 | Sun ........................... | D01F 8/14 428/401 |
| 2012/0231225 A1* | 9/2012 | Mikulak ................. | B29C 48/05 264/255 |

(Continued)

FOREIGN PATENT DOCUMENTS

| | | | |
|---|---|---|---|
| JP | 2008223190 A | * | 9/2008 |
| JP | 5238938 B2 | | 7/2013 |

(Continued)

*Primary Examiner* — Matthew D Matzek
(74) *Attorney, Agent, or Firm* — Oliff PLC (57) ABSTRACT

A filament for three-dimensional modeling includes two or more kinds of resins; a fiber; and a compatibilizing agent, and has a sea-island structure including a sea part and island parts, the sea part including at least one kind of the two or more kinds of resins and the island parts including at least one kind of the two kinds of resins.

12 Claims, 1 Drawing Sheet

(51) Int. Cl.
*B33Y 70/00* (2020.01)
*B33Y 10/00* (2015.01)

(56) References Cited

U.S. PATENT DOCUMENTS

| | | | | |
|---|---|---|---|---|
| 2012/0289107 A1* | 11/2012 | Beissinger | ................ | D01F 8/04 |
| | | | | 428/401 |
| 2016/0122528 A1 | 5/2016 | Kobayashi et al. | | |
| 2016/0288034 A1* | 10/2016 | Miyauchi | .................. | B32B 5/26 |
| 2021/0139685 A1* | 5/2021 | Herschke | ................ | C08J 3/128 |

FOREIGN PATENT DOCUMENTS

| | | | | | |
|---|---|---|---|---|---|
| JP | | 5712464 B2 | 5/2015 | | |
| JP | | 5780367 B2 | 9/2015 | | |
| WO | WO-2019221733 A1 * | 11/2019 | ........... | B29C 64/165 | |

\* cited by examiner

FILAMENT FOR THREE-DIMENSIONAL MODELING

CROSS-REFERENCE TO RELATED APPLICATIONS

This application is based on and claims priority under 35 USC 119 from Japanese Patent Application No. 2020-020649 filed Feb. 10, 2020.

BACKGROUND

(i) Technical Field

The present invention relates to a filament for three-dimensional modeling, a three-dimensional modeled article, a three-dimensional modeling method, and a three-dimensional modeling apparatus.

(ii) Related Art

Known is a fused deposition modeling (also referred to as FDM)-type modeling method in which a three-dimensional modeled article is modeled by discharging a plurality of heated filaments onto a discharge target body and stacking the filaments to form a laminate.

The filament (hereinafter, also referred to as the filament for three-dimensional modeling) includes, for example, a resin and a fiber.

Separately from the filament for three-dimensional modeling, an example of a composite material including a fiber and a resin is a long carbon fiber-reinforced composite material described in Japanese Patent No. 5712464. The long carbon fiber-reinforced composite material includes 30 to 250 parts by weight of maleic anhydride-modified polypropylene (B) having a melt flow rate of 30 to 150 g/10 min and 1 to 50 parts by weight of a polyamide resin (C) with respect to 100 parts by weight of a 7.5 mm or longer long carbon fiber (A), with the proviso that the total content of (B) and (C) is 35 to 260 parts by weight.

In addition, Japanese Patent No. 5780367 discloses a fiber-reinforced composite material including a cured product of an epoxy resin composition having a specific composition and a reinforcing fiber.

Furthermore, Japanese Patent No. 5238938 discloses a long fiber-reinforced composite resin material that contains a propylene resin, a long organic fiber, and talc and is obtained by a pultrusion method. In the long fiber-reinforced composite resin material, with respect to 100 parts by weight of the propylene resin, the ratio of the long organic fiber is 10 to 200 parts by weight, the ratio of the talc is 10 to 200 parts by weight, the long organic fiber is a long organic fiber having a polar resin attached to the surface, and the amount of the polar resin attached is 0.01 to 3.5% by weight of the long organic fiber.

SUMMARY

As described above, the filament for three-dimensional modeling includes, for example, a resin and a fiber, and a three-dimensional modeled article is obtained by applying the filament for three-dimensional modeling to a fused deposition modeling-type modeling method. However, there is a case where the bending elastic modulus of the obtained three-dimensional modeled article is not sufficient.

Therefore, aspects of non-limiting embodiments of the present disclosure relate to a filament for three-dimensional modeling which includes a resin, a fiber, and a compatibilizing agent and from which a three-dimensional modeled article having an excellent bending elastic modulus compared with a case where the three-dimensional modeled article does not have a sea-island structure attributable to the resin may be obtained.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a filament for three-dimensional modeling, including
  two or more kinds of resins;
  a fiber; and
  a compatibilizing agent, and
  having a sea-island structure including a sea part and island parts, the sea part including at least one kind of the two or more kinds of resins and the island parts including at least one kind of the two kinds of resins.

BRIEF DESCRIPTION OF THE DRAWINGS

Exemplary embodiments of the present invention will be described in detail based on the following FIGURE, wherein.

DETAILED DESCRIPTION

Hereinafter, an exemplary embodiment, which is an example of a filament for three-dimensional modeling of the present invention, will be described.

<Filament for Three-Dimensional Modeling>

A filament for three-dimensional modeling according to the exemplary embodiment (hereinafter, also simply referred to as the "filament") includes two or more kinds of resins, a fiber, and a compatibilizing agent and has a sea-island structure including a sea part and island parts. The sea part includes at least one kind of the two or more kinds of resins, and the island parts include at least one kind of the two or more kinds of resins.

In the exemplary embodiment, the "sea-island structure" refers to a phase-separated structure that is formed in a resin-mixed system and includes "island parts", which are dispersed phases, dispersed in a "sea part", which is a continuous phase. Therefore, in the exemplary embodiment, a form in which the circumference of a fiber is coated with a coating layer of a resin cannot be referred to as an "island part". That is, the "island part" does not include any fiber therein.

According to the filament according to the exemplary embodiment, a three-dimensional modeled article having an excellent bending elastic modulus may be obtained. The reason therefor is not clear, but is assumed as described below.

The filament according to the exemplary embodiment has a sea-island structure including two or more kinds of resins. When the filament having the sea-island structure as described above is applied to a fused deposition modeling-type modeling method, it is considered that, in an interface between adjacent filaments, the sea parts in the interfaces of the individual filaments melt and adhere to each other, and the island parts present near the interfaces of the individual filaments coalesce together.

It is considered that the coalescence of the island parts as described above develops an anchor effect in the interface between the adjacent filaments, and the adhesion of the interfaces improves, and, as a result, it is possible to increase the bending elastic modulus of the three-dimensional modeled article.

[Preferable Aspect of Sea-Island Structure]

The filament according to the exemplary embodiment has a sea-island structure in which two or more kinds of resins are used.

It is preferable that the sea-island structure is the following aspect.

In the filament according to the exemplary embodiment, from the viewpoint of further increasing the bending elastic modulus of the three-dimensional modeled article, when, in a cross section in a direction orthogonal to the axis, the area obtained by subtracting the area occupied by the fiber from the total area of the cross section is represented by S1, and the total area of the island parts is represented by S2, S2/S1×100 is preferably 5% or more and 49% or less, more preferably 10% or more and 40% or less, and still more preferably 15% or more and 35% or less.

In the filament according to the exemplary embodiment, from the viewpoint of further increasing the bending elastic modulus of the three-dimensional modeled article, in the cross section in the direction orthogonal to the axis, the diameter of the island part is preferably 0.1 μm or more and 20 μm or less, more preferably 1 μm or more and 10 μm or less, and still more preferably 2 μm or more and 10 μm or less.

Here, in the exemplary embodiment, the diameter of the island part refers to the equivalent circle diameter of the island part, i.e., a diameter of a circle having the same area as the area of the island part.

Here, the values of the total area, the area occupied by the fiber, and the area S1 obtained by subtracting the area occupied by the fiber from the total area in the cross section in the direction orthogonal to the axis are determined as described below.

The filament according to the exemplary embodiment is cut in the direction orthogonal to the axis to obtain a cross section in the direction orthogonal to the axis. Subsequently, the cross section is polished and is coated with osmium using a Neo Osmium Coater (Neoc-PRO manufactured by Meiwafosis Co., Ltd.) to obtain an observation surface.

Next, backscattered electron images of three visual fields on the observation surface are randomly captured using SEM (S-3400N manufactured by Hitachi, Ltd., accelerating voltage of 15 KV) at a magnification from 100 times to 1000 times.

Based on the captured photograph, the total area of the observation surface and the total area of the fiber (the sum of the areas of individual fiber parts) on the observation surface are obtained using image analysis software (LUZEX by Nireco Corporation). In addition, the area obtained by subtracting the area occupied by the fiber from the total area is calculated from the obtained values.

This procedure is carried out on the photographs of the three captured visual fields, and the arithmetic average values of the calculated values are regarded as the total area, the area occupied by the fiber, and the area S1 obtained by subtracting the area occupied by the fiber from the total area in the cross section in the direction orthogonal to the axis.

Next, the values of the total area S2 of the island parts, the diameters of the island parts, and the number of the island parts in the cross section in the direction orthogonal to the axis are obtained as described below.

The values of the total area S2 of the island parts, the diameters of the island parts, and the number of the island parts are obtained based on the photographs of three visual fields captured by the above-described method.

Specifically, based on the photograph captured by the above-described method, all of the island parts (that are dispersed phases dispersed in the sea part, which is a continuous phase, and do not include any fibers) are extracted using image analysis software (LUZEX by Nireco Corporation).

After that, the equivalent circle diameters and the number are selected as the measurement items of the individual island parts, and the diameters (equivalent circle diameters) of the individual island parts on the observation surface and the number of the island parts on the observation surfaces are obtained. In addition, from the obtained values, the total area of the island parts on the observation surface (the sum of the areas of the individual island parts) and the arithmetic average value of the diameters (equivalent circle diameters) of the individual island parts are calculated.

This procedure is carried out on the photographs of the three captured visual fields, and the arithmetic average values of the calculated values are regarded as the total area S2 of the island parts, the diameter of the island parts, and the number of the island parts in the cross section in the direction orthogonal to the axis.

Hereinafter, individual components of the filament according to the exemplary embodiment will be described in detail.

[Two or More Kinds of Resins]

The filament according to the exemplary embodiment includes two or more kinds of resins for obtaining the sea-island structure.

Examples of the two or more kinds of resins include thermoplastic resins. The combination of two or more kinds of resins is not particularly limited as long as the combination of the resins is capable of forming the sea part and the island parts when the resins are mixed together.

The combination of the resins capable of forming the sea part and the island parts is preferably a combination of resins having low compatibility with each other. More specifically, from the viewpoint of obtaining a preferable aspect of the above-described sea-island structure, a combination of resins having a difference in solubility parameter (so-called SP value) (the difference in SP value is preferably 5 or more and more preferably 5 or more and 10 or less) is exemplified.

Here, the solubility parameter (SP value) refers to a value calculated by Fedor's method. Specifically, the solubility parameter (SP value) is based on, for example, the description of Polym. Eng. Sci., Vol. 14, p. 147 (1974), and the SP value is calculated from the following expression.

$$\text{SP value} = \sqrt{(Ev/v)} = \sqrt{(\Sigma \Delta ei / \Sigma \Delta vi)} \qquad \text{Expression:}$$

(In the expression, Ev: evaporation energy (cal/mol), v: molar volume (cm$^3$/mol), Δei: evaporation energy of each atom or atomic group, Δvi: molar volume of each atom or atomic group)

The solubility parameter (SP value) employs (cal/cm$^3$)$^{1/2}$ as the unit, but is expressed in a dimensionless manner without the unit according to the convention.

Each of the sea part and the island part in the sea-island structure may be formed of one kind of resin or may be formed of two or more kinds of resins. In addition, the filament according to the exemplary embodiment may have a plurality of kinds of island parts formed of one kind of resin. That is, the filament according to the exemplary embodiment may have, for example, an island part A formed of a resin a and island parts B formed of a resin b that is different from the resin a.

In the exemplary embodiment, from the viewpoint of further increasing the bending elastic modulus, it is preferable that the melting temperature of at least one kind of the resins included in the sea part is lower than the melting temperature of at least one kind of the resins included in the island part.

From the viewpoint of further increasing the bending elastic modulus, it is preferable that the melting temperatures of all of the resins included in the sea part are lower than the melting temperatures of all of the resins included in the island part.

The difference in melting temperature is preferably 20° C. or more, more preferably 40° C. or more, and still more preferably 60° C. or more.

In addition, the upper limit of the difference in melting temperature is, for example, preferably 300° C. or lower and more preferably 280° C. or lower from the viewpoint of the producing suitability of the three-dimensional modeled article, the viewpoint of the heating deterioration of the resin, and the like.

Here, the melting temperature (Tm, also referred to as the melting point) of the resin is obtained from the "peak melting temperature $T_{pm}$" described in the method for determining the melting temperature in JIS K 7121: 1987 "Testing Methods for Transition Temperatures of Plastics" in a DSC curve obtained by differential scanning calorimetry (DSC).

The melting temperatures of the resins included in the sea part and the resins included in the island part are measured by the following method.

In a case where the resins in the filament are separated into the sea part and the island parts, the melting temperatures of the resins included in the sea part and in the island parts appear respectively and independently by collectively measuring the resins by DSC. In the exemplary embodiment, the melting temperatures of the resins included in the sea part and the resins included in the island part are obtained by this method.

The filament according to the exemplary embodiment preferably includes a first resin formed of a polyolefin and a second resin selected from the group consisting of a resin including at least one of an amide bond and an imide bond, a resin including an ester bond, and a resin having a bonding group including sulfur from the viewpoint of easily forming a three-dimensional modeled article having an excellent bending elastic modulus and from the viewpoint of easily forming a preferable aspect of the above-described sea-island structure.

In addition, it is preferable that any one of the first resin and the second resin forms the sea part and the other forms the island parts.

(First Resin)

The first resin is formed of a polyolefin.

The first resin may form the sea part or may form the island part.

One kind of polyolefin may be used singly or two or more kinds of polyolefins may be used in combination.

The polyolefin is a resin having a repeating unit derived from an olefin and may have a repeating unit derived from a monomer other than olefins as long as the content of the repeating unit is 30% by weight or less of the entire resin.

The polyolefin is obtained by the addition polymerization of an olefin (a monomer other than olefins as necessary).

In addition, the number of the kinds of each of the olefin and the monomer other than olefins for obtaining the polyolefin may be one or more.

The polyolefin may be a copolymer or may be a homopolymer. In addition, the polyolefin may be linear or branched.

Here, examples of the olefin include linear or branched aliphatic olefins and alicyclic olefins.

Examples of the aliphatic olefins include α-olefins such as ethylene, propylene, 1-butene, 1-hexene, 4-methyl-1-pentene, 1-octene, 1-decene, 1-hexadecene, and 1-octadecene.

Examples of the alicyclic olefins include cyclopentene, cycloheptene, norbornene, 5-methyl-2-norbornene, tetracyclododecene, vinylcyclohexane, and the like.

Among these, from the viewpoint of the cost, α-olefin is preferable, ethylene and propylene are more preferable, and propylene is particularly preferable.

In addition, as the monomer other than olefins, a well-known addition-polymerizable compound is selected.

Examples of the addition-polymerizable compound include styrenes such as styrene, methyl styrene, α-methyl styrene, β-methyl styrene, t-butyl styrene, chlorostyrene, chloromethylstyrene, methoxystyrene, styrenesulfonic acid and salts thereof; (meth)acrylic acid esters such as alkyl (meth)acrylate, benzyl (meth)acrylate, and dimethylaminoethyl (meth)acrylate; halovinyls such as vinyl chloride; vinyl esters such as vinyl acetate and vinyl propionate; vinyl ethers such as vinyl methyl ether; vinylidene halides such as vinylidene chloride; N-vinyl compounds such as N-vinylpyrrolidone; and the like.

Examples of a suitable polyolefin include polypropylene (PP), polyethylene (PE), polybutene, polyisobutylene, a coumarone-indene resin, a terpene resin, an ethylene-vinyl acetate copolymer resin (EVA), and the like.

Among these, the polyolefin is preferably a resin having only a repeating unit derived from an olefin and, from the viewpoint of the cost, particularly preferably polypropylene.

The molecular weight of the polyolefin is not particularly limited and may be determined depending on the kind of the resin, the modeling condition, the use of the obtained three-dimensional modeled article, and the like.

The weight average molecular weight (Mw) of the polyolefin is, for example, preferably from 10,000 to 300,000 and more preferably from 10,000 to 200,000.

The weight average molecular weight (Mw) of the polyolefin is measured by gel permeation chromatography (GPC) under the following conditions.

A high temperature GPC system "HLC-8321GPC/HT" is used as a GPC apparatus, and o-dichlorobenzene is used as an eluent. The polyolefin is once melted and filtered in o-dichlorobenzene at a high temperature (a temperature of 140° C. or higher and 150° C. or lower), and the filtrate is used as a measurement sample. As the measurement conditions, the sample concentration is 0.5%, the flow rate is 0.6 ml/min, the amount of sample injected is 10 µl, and an RI detector is used. In addition, the calibration curve is produced from 10 samples of "polystyrene standard sample TSK standard" manufactured by Tosoh Corporation: "A-500", "F-1", "F-10" "F-80" "F-380", "A-2500", "F-4", "F-40" "F-128", and "F-700".

In addition, similar to the above-described molecular weight, the glass transition temperature (Tg) and the melting temperature (Tm) of the polyolefin are not particularly limited and may be determined depending on the kind of the resin, the modeling condition, the use of the obtained three-dimensional modeled article, and the like.

For example, the melting temperature (Tm) of the polyolefin is preferably from 100° C. to 300° C. and more preferably from 150° C. to 250° C.

The melting temperature (Tm) of the polyolefin is obtained by the above-described method for measuring the melting temperature of the resin.

The content of the first resin may be determined depending on the formability of the sea-island structure, the use of the three-dimensional modeled article, and the like.

The content of the first resin is, for example, preferably 35% by weight or more and 90% by weight or less, more preferably 40% by weight or more and 80% by weight or less, and still more preferably 40% by weight or more and 70% by weight or less with respect to the total weight of the filament.

In a case where the first resin is included in the sea part, the content of the first resin is, for example, preferably 56% by weight or more and 98.2% by weight or less, more preferably 68% by weight or more and 96% by weight or less, and still more preferably 75% by weight or more and 94% by weight or less with respect to the total weight of the filament.

In a case where the first resin is included in the island parts, the content of the first resin is preferably 1.8% by weight or more and 44% by weight or less, more preferably 4% by weight or more and 32% by weight or less, and still more preferably 6% by weight or more and 25% by weight or less with respect to the total weight of the filament.

(Second Resin) The second resin is selected from the group consisting of a resin having at least one of an amide bond and an imide bond (hereinafter, also referred to as a specific resin a), a resin having an ester bond (hereinafter, also referred to as a specific resin b), and a resin having a bonding group including sulfur (hereinafter, also referred to as specific resin c).

The second resin may form the sea part or may form the island part.

One kind of the second resin may be used singly or two or more kinds of the second resins may be used in combination.

—Specific Resin a—

The specific resin a has at least one of an imide bond and an amide bond in the molecule.

The imide bond or the amide bond in the specific resin a develops an affinity to a polar group present on the surface of the fiber (for example, a carbon fiber). Therefore, there is a case where a part of the specific resin a coats at least a part of the fiber surface, whereby the adhesion between the fiber and the specific resin a enhances.

Specific kinds of the specific resin a include, specifically, polyamide (PA), polyimide (PI), polyamide-imide (PAI), polyetherimide (PEI), polyamino acid, and the like.

It is preferable that the specific resin a has low compatibility with the first resin (that is, a polyolefin) and has a different SP value from the first resin (that is, a polyolefin).

Particularly, the specific resin a is preferably polyamide (PA) from the viewpoint of the capability of being molded at low temperatures, the viewpoint of further improving the bending elastic modulus, and the viewpoint of being excellent in the adhesion to the fiber.

Examples of the polyamide include a polyamide obtained by the condensation copolymerization of dicarboxylic acid and a diamine and a polyamide obtained by the condensation of a lactam. That is, examples of the polyamide include polyamides having at least one of a structural unit in which a dicarboxylic acid and a diamine are condensation-polymerized and a structural unit in which a lactam is ring-opened.

Examples of the dicarboxylic acid include oxalic acid, adipic acid, suberic acid, sebacic acid, terephthalic acid, isophthalic acid, 1,4-cyclohexanedicarboxylic acid, malonic acid, succinic acid, glutaric acid, pimelic acid, azelaic acid, phthalic acid, and the like, and, among these, adipic acid and terephthalic acid are preferable.

Examples of the diamine include ethylenediamine, pentamethylenediamine, hexamethylenediamine, nonanediamine, decamethylenediamine, 1,4-cyclohexanediamine, p-phenylenediamine, m-phenylenediamine, m-xylenediamine, and the like, and, among these, hexamethylenediamine is preferable.

Examples of the lactam include ε-caprolactam, undecane lactam, lauryl lactam, and the like, and, among these, ε-caprolactam is preferable.

One kind of dicarboxylic acid, diamine, or lactam described above may be used singly or two or more kinds of dicarboxylic acids, diamines, or lactams may be used in combination.

The polyamide may be an aromatic polyamide or an aliphatic polyamide.

Examples of the aromatic polyamide include MXD6 (condensation polymer of adipic acid and meta-xylenediamine; melting point: 237° C.), Nylon 6T (condensation polymer of terephthalic acid and hexamethylenediamine; melting point: 310° C.), Nylon 9T (condensation polymer of terephthalic acid and nonanediamine; melting point: 306° C.), and the like.

Examples of the commercially available products of the aromatic polyamide include "MXD6" manufactured by Mitsubishi Gas Chemical Company, Inc., "GENESTAR (registered trademark): PA6T" manufactured by Kuraray Co., Ltd., "GENESTAR (registered trademark): PAST" manufactured by Kuraray Co., Ltd. "TY-502NZ: PA6T" manufactured by Toyobo Co., Ltd., and the like.

Examples of the aliphatic polyamide include Nylon 6 (ring-opened polycondensate of ε-caprolactam; melting point: 225° C.), Nylon 11 (ring-opened polycondensate of undecane lactam; melting point: 185° C.), Nylon 12 (ring-opened polycondensate of lauryl lactam; melting point: 175° C.), Nylon 66 (condensation polymer of adipic acid and hexamethylenediamine; melting point: 260° C.), Nylon 610 (condensation polymer of sebacic acid and hexamethylenediamine; melting point: 225° C.), Nylon 612 (condensation polymer of caprolactam (having 6 carbon atoms) and lauryl lactam (having 12 carbon atoms): melting point: 220° C.), and the like.

Examples of the commercially available products of the aliphatic polyamide include "ZYTEL (registered trademark): 7331) (PA6)" manufactured by Dupont, "ZYTEL (registered trademark): 101L (PA66)" manufactured by Dupont, and the like.

In a case where the first resin is polypropylene, among these polyamides, at least one kind selected from the group consisting of MXD6, Nylon 6, and Nylon 12 may be included as the polyamide.

In addition, in a case where the first resin is polyethylene, the polyamide may be Nylon 12, Nylon 11, or MXD6.

The molecular weight of the specific resin a is not particularly limited and may be determined depending on which of the sea part or the island part the specific resin a is included, the melting temperature, or the like. When the specific resin a is the polyamide, for example, the weight average molecular weight of the polyamide is preferably from 10,000 to 300,000 and more preferably from 10,000 to 100,000.

In addition, the glass transition temperature or the melting point of the specific resin a may be determined depending on which of the sea part or the island part the specific resin a is included in, the melting temperature, or the like. When the specific resin a is the polyamide, for example, the glass transition temperature or the melting point of the polyamide is preferably from 100° C. to 400° C., more preferably from 150° C. to 350° C., still more preferably 150° C. or higher and 250° C. or lower, and most preferably 160° C. or higher and 240° C. or lower.

—Specific Resin b—

The specific resin b has an ester bond in the molecule.

The specific resin b has an ester bond, and thus the affinity to the polar group present on the surface of the fiber (for example, a carbon fiber) is developed. Therefore, there is a case where a part of the specific resin b coats at least a part of the fiber surface, whereby the adhesion between the fiber and the specific resin b enhances.

The specific resin b is not particularly limited as long as the specific resin b has an ester bond in the molecule.

Examples of the specific kinds of the specific resin b include thermoplastic resins having an ester bond in the main chain, and specific examples thereof include polyesters, polycarbonates, and the like.

As the specific resin b, a polyester is preferable.

The polyester may be any of an aliphatic polyester and an aromatic polyester. The polyester may be, for example, a condensation-polymerized product of a polyhydric alcohol and a polyhydric carboxylic acid. As the polyester, a commercially available product may be used or a synthesized product may be used.

One kind of the specific resin b may be used singly or two or more kinds of the specific resins b may be used in combination.

Examples of the polyhydric carboxylic acid include aliphatic dicarboxylic acids (for example, oxalic acid, malonic acid, maleic acid, fumaric acid, citraconic acid, itaconic acid, glutaconic acid, succinic acid, alkenylsuccinic acid, adipic acid, sebacic acid, and the like), alicyclic dicarboxylic acids (for example, cyclohexanedicarboxylic acid and the like), aromatic dicarboxylic acids (for example, terephthalic acid, isophthalic acid, phthalic acid, naphthalenedicarboxylic acid, and the like), anhydrides thereof, and lower alkyl esters thereof (for example, having one or more carbon atoms and five or less carbon atoms). Among these, as the polyhydric carboxylic acid, for example, the aromatic dicarboxylic acid is preferable.

As the polyhydric carboxylic acid, together with a dicarboxylic acid, a tri- or higher valent carboxylic acid having a crosslinked structure or a branched structure may be used in combination. Examples of the tri- or higher valent carboxylic acid include trimellitic acid, pyromellitic acid, anhydrides thereof, lower alkyl esters thereof (for example, having one or more carbon atoms and five or less carbon atoms), and the like.

One kind of polyhydric carboxylic acid may be used singly or two or more kinds of polyhydric carboxylic acids may be used in combination.

Examples of the polyhydric alcohol include aliphatic diols (for example, ethylene glycol, diethylene glycol, triethylene glycol, propylene glycol, butanediol, hexanediol, neopentyl glycol, and the like), alicyclic diols (for example, cyclohexanediol, cyclohexanedimethanol, hydrogenated bisphenol A, and the like), and aromatic diols (for example, ethylene oxide adducts of bisphenol A, propylene oxide adducts of bisphenol A, and the like). Among these, as the polyhydric alcohol, for example, the aromatic diol and the alicyclic diol are preferable, and the aromatic diol is more preferable.

As the polyhydric alcohol, together with a diol, a tri- or higher valent polyhydric alcohol having a crosslinked structure or a branched structure may be used in combination. Examples of the tri- or higher valent polyhydric alcohol include glycerin, trimethylolpropane, and pentaerythritol.

One kind of the polyhydric alcohol may be used singly or two or more kinds of the polyhydric alcohols may be used in combination.

The polyester is obtained by a well-known production method. Specifically, the polyester is obtained by, for example, a method in which the polymerization temperature is set to 180° C. or higher and 230° C. or lower, the pressure in the reaction system is reduced as necessary, and a reaction is caused while removing water or an alcohol generated during condensation.

In a case where a monomer that is the raw material is not soluble or compatible at the reaction temperature, the monomer may be dissolved by adding a solvent having a high boiling point as a solubilizing agent. In this case, the polycondensation reaction is caused while distilling away the solubilizing agent. In a case where there is a poorly compatible monomer, it is preferable to condense the poorly compatible monomer and an acid or alcohol that is planned to be polycondensed with the monomer in advance and then polycondense the monomer together with a main component.

Specific examples of the polyester include polyethylene terephthalate (PET), polybutylene terephthalate (PBT), and the like. Among these, polybutylene terephthalate (PBT) is preferable.

Examples of the commercially available products of the polyester include "NOVADURAN 5010R3-2" (polybutylene terephthalate) manufactured by Mitsubishi Engineering-Plastics Corporation, "DURANEX 2000" (polybutylene terephthalate) manufactured by Polyplastics Co., Ltd., and the like.

—Specific Resin c—

The specific resin c is a resin having a bonding group including sulfur in the molecule.

In the exemplary embodiment, the resin having a bonding group including sulfur refers to a resin having a bonding group including sulfur in the main chain.

The bonding group including sulfur in the main chain develops an affinity to the polar group present on the surface of the fiber (for example, a carbon fiber). Therefore, there is a case where a part of the specific resin c coats at least a part of the fiber surface, whereby the adhesion between the fiber and the specific resin c enhances.

The specific resin c is not particularly limited as long as the specific resin c has a bonding group including sulfur in the main chain.

Examples of the specific kinds of the specific resin c include thermoplastic resins linked by sulfur that is a linking group, thermoplastic resins having a sulfonyl bond in the main chain, and the like. Specific examples thereof include polyphenylene sulfide, polysulfone, polyethersulfone, polyphenylsulfone, and the like.

The specific resin c is obtained by a well-known production method.

As the specific resin c, a commercially available product may be used or a synthesized product may be used.

One kind of the specific resin c may be used singly or two or more kinds of the specific resins c may be used in combination.

Examples of the commercially available products of the specific resin c include "FZ-2100" (polyphenylene sulfide) by DIC Corporation, "SUMIKAEXCEL 3600G" (polyethersulfone) by Sumitomo Chemical Co., Ltd., and the like.

The glass transition temperatures or the melting points of the specific resin b and the specific resin c may be determined depending on which of the sea part or the island part the specific resin is included in, the melting temperature, or the like. The glass transition temperatures or the melting points of the specific resin b and the specific resin c are preferably from 100° C. to 400° C., more preferably from 150° C. to 350° C., still more preferably 150° C. or higher and 250° C. or lower, and most preferably 160° C. or higher and 240° C. or lower.

The content of the second resin may be determined depending on the formability of the sea-island structure, the use of the three-dimensional modeled article, and the like.

The content of the second resin is, for example, preferably 35% by weight or more and 90% by weight or less, more preferably 40% by weight or more and 80% by weight or less, and still more preferably 40% by weight or more and 70% by weight or less with respect to the total weight of the filament.

In a case where the first resin is included in the sea part, the content of the first resin is, for example, preferably 56% by weight or more and 98.2% by weight or less, more preferably 68% by weight or more and 96% by weight or less, and still more preferably 75% by weight or more and 94% by weight or less with respect to the total weight of the filament.

In a case where the first resin is included in the island parts, the content of the first resin is preferably 1.8% by weight or more and 44% by weight or less, more preferably 4% by weight or more and 32% by weight or less, and still more preferably 6% by weight or more and 25% by weight or less with respect to the total weight of the filament.

[Fiber]

The filament according to the exemplary embodiment includes a fiber.

As the fiber, a well-known reinforcing fiber, which is applied to a resin molded article, is used, and examples thereof include a carbon fiber, a glass fiber, a metal fiber, an aramid fiber, and the like.

One kind of the fiber may be used singly or two or more kinds of the fibers may be used in combination.

Among these, the carbon fiber is preferable from the viewpoint of the excellent affinity to the above-described second resin and the possibility of further improving the bending elastic modulus of the three-dimensional modeled article.

The carbon fiber has a carboxyl group on the surface. A high affinity is developed between the carboxyl group and the partial structure of the second resin (particularly, the amide bond and/or the imide bond in the specific resin a). Therefore, it is considered that a coating layer of the second resin (preferably the specific resin a) is easily formed around the carbon fiber, and the bending elastic modulus of the molded three-dimensional modeled article is further improved.

As the carbon fiber, a well-known carbon fiber is used, and any of a polyacrylonitrile (PAN) carbon fibers and a pitch carbon fibers may be used.

The fiber may be a fiber that has been subjected to a well-known surface treatment.

When the fiber is a carbon fiber, examples of the surface treatment include an oxidation treatment and a sizing treatment.

In addition, the diameter of the fiber (also referred to as the fiber diameter), the length of the fiber (also referred to as the fiber length), and the like are not particularly limited.

From the viewpoint of obtaining a three-dimensional modeled article having a higher mechanical strength, a long fiber length is preferable, and thus a continuous fiber is more preferable as the fiber.

Here, the "continuous fiber" in the exemplary embodiment means a fiber having a fiber length of 10 mm or more. The fiber length of the continuous fiber is preferably 100 mm or more and more preferably the same as the length of the filament according to the exemplary embodiment.

That is, it is particularly preferable that the fiber in the filament according to the exemplary embodiment is a continuous fiber that is continuous from the tip to the terminal of the filament.

Here, a method for measuring the fiber length is as described below.

The filament is cut along the axial direction, and the fiber length of the fiber in the obtained cross section is measured. Specifically, the fiber is observed with an optical microscope at a magnification of 100 times, and the length of the fiber is measured. In addition, this measurement is carried out on 200 fibers, and the arithmetic average value is regarded as the fiber length.

In addition, the fiber diameter may be appropriately determined depending on the diameter, design mechanical characteristics, and the like of the filament. The fiber diameter may be, for example, 5 μm or more and 15 μm or less (preferably 5 μm or more and 10 μm or less).

Here, a method for measuring the fiber diameter is as described below.

A cross section orthogonal to the length direction of the fiber is observed with a scanning electron microscope (SEM) at a magnification of 1000 times, and the diameter of the reinforcing fiber is measured. In addition, this measurement is carried out on 100 reinforcing fibers, and the average value thereof is regarded as the average diameter of the reinforcing fiber.

Furthermore, the form of the fiber is not particularly limited and may be selected depending on a method for molding the resin molded article, the use of the resin molded article, and the like.

Examples of the form of the fiber include a single fiber, a fiber bundle including a number of single fibers, and the like.

As the reinforcing fiber (for example, a carbon fiber), a commercially available product may be used.

Examples of the commercially available product of the PAN carbon fiber include "TORAYCA (registered trademark)" by Toray Industries, Inc., "TENAX" by Toho Tenax Co., Ltd., "PYROFIL (registered trademark)" by Mitsubishi Chemical Corporation, and the like. Additionally, examples of the commercially available products of the PAN carbon fiber also include the commercially available products by Hexcel Works, Inc., Cytec Engineered Materials Inc., DowAksa, Formosa Plastics Corporation, and SGL Carbon Japan Co., Ltd.

Examples of the commercially available products of the pitch carbon fiber include "DIALEAD (registered trademark)" by Mitsubishi Chemical Corporation, "GRANOC" by Nippon Graphite Fiber Co., Ltd., "KRECA" by Kureha Corporation, and the like. Additionally, examples of the commercially available products of the pitch carbon fiber also include the commercially available products by Osaka Gas Chemicals Co., Ltd. and Cytec Engineered Materials Inc.

Examples of the commercially available products of the glass fiber include "ROVING" by Nitto Boseki Co., Ltd. and the like.

The content of the fiber may be determined depending on physical properties demanded for the three-dimensional modeled article, the use of the three-dimensional modeled article, and the like, and, for example, with respect to the total weight of the filament, the content of the fiber is preferably 10% by weight or more and 65% by weight or less, more preferably 20% by weight or more and 60% by weight or less, and still more preferably 30% by weight or more and 60% by weight or less.

[Compatibilizing Agent]

The compatibilizing agent is a resin that enhances the affinity between the resins included in the filament (for example, the affinity between the first resin and the second resin).

The compatibilizing agent may be determined depending on the resin included in the filament.

The compatibilizing agent is preferably a resin that has the same partial structure as one kind of the two or more kinds of resins included in the filament and has a partial structure having an affinity to another kind of resin.

In a case where the filament according to the exemplary embodiment includes the first resin and the second resin, which are described above, as the two or more kinds of resins, the compatibilizing agent is preferably a resin that has the same partial structure as the first resin and has a partial structure having an affinity to the second resin.

For example, as the compatibilizing agent, which is the resin that has the same partial structure as the first resin and has a partial structure having an affinity to the second resin, a modified polyolefin is preferably used.

When the first resin is polypropylene (PP), the modified polyolefin is preferably modified polypropylene (PP). Similarly, when the first resin is an ethylene-vinyl acetate copolymer resin (EVA), the modified polyolefin is preferably a modified ethylene-vinyl acetate copolymer resin (EVA).

(Modified Polyolefin)

The modified polyolefin suitable as the compatibilizing agent is preferably at least one selected from the group consisting of a polyolefin having a modified branch (hereinafter, also referred to as a branch-modified polyolefin) and a polyolefin having a modified main chain terminal (hereinafter, also referred to as a main chain terminal-modified polyolefin).

Examples of the polyolefin having a modified branch or main chain terminal include polyolefins similar to the polyolefin that is the first resin, and, among them, polypropylene is preferable.

Here, examples of the polypropylene include, in addition to homopolymers of propylene, random polypropylene of propylene and a small amount (for example, 10% by weight or less in polypropylene) of a different α-olefin (for example, ethylene or the like), block polypropylene of propylene and a different α-olefin, and the like.

—Branch-Modified Polyolefin—

The polyolefin having a modified branch refers to a polyolefin in which a modification moiety is introduced into a side-chain.

Examples of the modification moiety that is introduced into the branch of the polyolefin include a carboxy group, a carboxylic acid anhydride residue, a carboxylic ester residue, an imino group, an amino group, an epoxy group, and the like.

From the viewpoint of further improving the affinity between the first resin and the second resin (more preferably the specific resin a), the modification moiety introduced into the polyolefin preferably includes a carboxylic acid anhydride residue and particularly preferably includes a maleic anhydride residue.

As a method for producing the polyolefin having a modified branch, there are a method in which a compound having the above-described modification moiety is reacted with a polyolefin and directly chemically bonded to the polyolefin, a method in which a graft chain is formed using a compound having the above-described modification site, and this graft chain is bonded to a polyolefin, and the like.

Examples of the compound having the above-described modification moiety include maleic anhydride, fumaric anhydride, citric acid anhydride, N-phenyl maleimide, N-cyclohexyl maleimide, glycidyl (meth)acrylate, glycidyl vinyl benzoate, N-[4-(2,3-epoxypropoxy)-3,5-dimethylbenzyl] acrylamide, alkyl (meth)acrylate, and derivatives thereof.

Among the branch-modified polyolefins, a branch-modified polyolefin formed by reacting maleic anhydride, which is an unsaturated carboxylic acid, with a polyolefin is preferable.

Specific examples of the branch-modified polyolefin include maleic anhydride-modified polypropylene, maleic anhydride-modified polyethylene, a maleic anhydride-modified ethylene-vinyl acetate copolymer resin (EVA), and acid-modified polyolefins such as adducts or copolymers thereof.

As the branch-modified polyolefin, a commercially available product may be used.

Examples of the modified propylene include UMEX (registered trademark) series (100TS, 110TS, 1001, and 1010) by Sanyo Chemical Industries, Ltd.

Examples of the modified polyethylene include UMEX (registered trademark) series (2000) by Sanyo Chemical Industries, Ltd., MODIC (registered trademark) series by Mitsubishi Chemical Corporation, and the like.

Examples of the modified ethylene-vinyl acetate copolymer resin (EVA) include MODIC (registered trademark) series by Mitsubishi Chemical Corporation and the like.

In addition, as the compatibilizing agent in the case of using the specific resin b and the specific resin c as the second resin, commercially available products below are used.

That is, "KRATON FG polymer" by Kraton Corporation, which is maleic anhydride-modified styrene-ethylene-butylene-styrene copolymer (maleic anhydride-modified SEBS), "MODIPER (registered trademark) A4300" by NOF Corporation, which is a graft polymer having a butyl acrylate-methyl methyl methacrylate copolymer (graft chain) bonded to a branch of an ethylene-glycidyl methacrylate copolymer, and the like are exemplified.

—Main Chain Terminal-Modified Polyolefin—

The polyolefin having a modified main chain terminal refers to a polyolefin having a modification moiety introduced into at least one (preferably both) of the main chain terminals (namely, terminals of the main chain).

Examples of the modification moiety introduced into the main chain terminal of the polyolefin include polymers having a polar group and the like.

Examples of the polar group in the modification moiety include a carboxyl group, metallic salts of a carboxyl group (for example, sodium salt, potassium salt, zinc salt, and the like), and the like.

More specifically, the main chain terminal-modified polyolefin is preferably a block polymer in which at least one kind of polymer selected from the group consisting of poly(meth)acrylic acid and a metallic salt of poly(meth)

acrylic acid is introduced into at least one (preferably both) of the main chain terminals of a polyolefin.

Here, examples of the metallic salt of poly(meth)acrylic acid include a sodium salt, a potassium salt, a zinc salt, and the like of poly(meth)acrylic acid, and, among these, a sodium salt is preferable.

Among them, as the main chain terminal-modified polyolefin, a ternary block polymer of poly(meth)acrylic acid-polyolefin-poly(meth) acrylic acid and a ternary block polymer of a sodium salt of poly(meth)acrylic acid-polyolefin-a sodium salt of poly(meth)acrylic acid are preferable.

In the above-described ternary block polymers, the number average molecular weight of the polyolefin is preferably 1000 or more and 200000 or less and more preferably 10000 or more and 50000 or less. In addition, in the above-described ternary block polymer, the number average molecular weight of each of the poly(meth)acrylic acid or the sodium salt of poly(meth)acrylic acid is preferably 500 or more and 10000 or less and more preferably 1000 or more and 5000 or less.

As the main chain terminal-modified polyolefin, a commercially available product may be used.

Specific examples of the commercially available product include the ternary block copolymer of polyacrylic acid-isotactic polypropylene-polyacrylic acid (Mn: 4000-23000-4000, also referred to as iPP-PAA), the ternary block copolymer of sodium polyacrylate-isotactic polypropylene-sodium polyacrylate (Mn: 5000-23000-5000, also referred to as iPP-PAA-Na or iPP-PAA/Na), and the ternary block copolymer of polyacrylic acid-random polypropylene-polyacrylic acid (Mn: 2500-17000-2500, also referred to as rPP-PAA) by San-ei Kogyo Corp.

The content of the compatibilizing agent may be determined depending on physical properties demanded for the three-dimensional modeled article, the use of the three-dimensional modeled article, and the like, and, for example, with respect to the total weight of the filament, the content of the compatibilizing agent is preferably 0.35% by weight or more and 18% by weight or less, more preferably 0.8% by weight or more and 12% by weight or less, and still more preferably 1.2% by weight or more and 7% by weight or less.

In addition, the content of the compatibilizing agent is preferably 1% by weight or more and 20% by weight or less, more preferably 2% by weight or more and 6% by weight or less, and still more preferably 3% by weight or more and 10% by weight or less with respect to the total weight of the resin components other than the compatibilizing agent (specifically, the first resin, the second resin, which are described above, and the like).

—Other Components—

The resin molded article according to the exemplary embodiment may include, in addition to the individual components described above, other components.

Examples of the other components include well-known additives such as a flame retardant, a flame retardant promoter, an anti-sagging (drip) agent that functions when heated, a plasticizer, an antioxidant, a release agent, a lightfast agent, a weather-proofing agent, a colorant, a pigment, a modifier, an antistatic agent, a hydrolysis inhibitor, a filler, and a reinforcing agent that is not the reinforcing fiber (talc, clay, mica, glass flakes, milled glass, glass beads, crystalline silica, alumina, silicon nitride, aluminum nitride, boron nitride, or the like).

The total amount of the other components used is, for example, preferably 10% by weight or less and more preferably 5% by weight or less with respect to the total weight of the filament according to the exemplary embodiment. The filament according to the exemplary embodiment may not include the other components.

[Method for Producing Filament]

A method for producing the filament according to the exemplary embodiment is not particularly limited as long as the method is capable of forming the sea-island structure as described above.

The method for producing the filament according to the exemplary embodiment may be, for example, a method in which a molten mixture including the two or more kinds of resins, the fiber, and the compatibilizing agent, which are described above, (which may include the other components as necessary) is prepared, and this molten mixture is molded into a linear shape. In addition, the method for producing the filament according to the exemplary embodiment may be a method in which a molten mixture including components except for the fiber (that is, the two or more kinds of resins, the compatibilizing agent, and other components additionally added as necessary, which will be true below) is prepared, the fiber is impregnated with this molten mixture, and the molten mixture is molded into a linear shape.

In a case where the fiber is a continuous fiber, the following method is preferably used as the method for producing the filament according to the exemplary embodiment.

That is, a molten mixture including the components other than the fiber is brought into contact with a continuous fiber (specifically, a continuous fiber bundle), which is continuously fed, to impregnate the continuous fiber with the molten mixture, and the continuous fiber impregnated with the molten mixture is fed to pass through a hole having a predetermined diameter, thereby molding the fiber into a linear shape.

<Three-Dimensional Modeled Article>

A three-dimensional modeled article according to the exemplary embodiment is a three-dimensional modeled article which includes two or more kinds of resins, a fiber, and a compatibilizing agent, has a sea-island structure including a sea part and island parts, and includes granular materials present in a dotted manner. The sea part includes at least one kind of the two or more kinds of resins, and the island parts include at least one kind of the two or more kinds of resins. Some of the island parts coalesce together to form the granular material.

The three-dimensional modeled article according to the exemplary embodiment is excellent in terms of the bending elastic modulus.

The "granular material formed by some of the island parts coalesced together" in the three-dimensional modeled article according to the exemplary embodiment is a material formed in the interface between adjacent filaments when the three-dimensional modeled article is produced by the fused deposition modeling (FDM). It is assumed that this granular material develops an anchor effect in the interface between adjacent filaments, and as a result, the adhesion of the interface between the adjacent filaments improves, whereby the bending elastic modulus of the three-dimensional modeled article may be enhanced.

In the exemplary embodiment, the "granular material formed by some of the island parts coalesced together" refers to a fused body in which the resins included in two or more island parts fuse together, and, unlike the single island part, this fused body has twice or more the volume of the single island part, and has a structure having a constricted or stepped part.

The three-dimensional modeled article according to the exemplary embodiment is lightweight and has an excellent bending elastic modulus.

Therefore, examples of the use of the three-dimensional modeled article include moving bodies such as aircrafts, automobiles, bicycles, and drones, orthotic equipment, assist suits, wearable members and apparatuses such as wearable devices, sports equipment such as soles and rackets, infrastructures such as utility poles, electric wires, and underground tunnels, building materials, tools, a variety of cases, and the like.

The three-dimensional modeled article according to the exemplary embodiment is produced with the above-described filament according to the exemplary embodiment.

More specifically, the three-dimensional modeled article according to the exemplary embodiment is preferably produced by a method for producing a three-dimensional modeled article according to the exemplary embodiment, which will be described below, using the above-described filament according to the exemplary embodiment.

<Method and Apparatus for Producing Three-Dimensional Modeled Article>

A method for producing a three-dimensional modeled article according to the exemplary embodiment has a step of heating the filament according to the exemplary embodiment and a step of discharging the heated filament for three-dimensional modeling onto a discharge target body to form a laminate of the filament for three-dimensional modeling on the discharge target body.

The method for producing a three-dimensional modeled article according to the exemplary embodiment is carried out with a three-dimensional modeling apparatus according to the exemplary embodiment described below.

That is, the three-dimensional modeling apparatus according to the exemplary embodiment includes a heating unit that stores the filament for three-dimensional modeling according to the exemplary embodiment and heats the filament for three-dimensional modeling and a discharge unit that discharges the heated filament for three-dimensional modeling onto a discharge target body to form a laminate of the filament for three-dimensional modeling on the discharge target body.

The three-dimensional modeling apparatus according to the exemplary embodiment (hereinafter, also simply referred to as the modeling apparatus) is a fusion deposition modeling (FDM)-type three-dimensional modeling apparatus (3D printer) and is an apparatus for modeling a three-dimensional modeled article by stacking a plurality of layers according to the layer data of the plurality of layers to obtain a laminate.

Hereinafter, the details of the three-dimensional modeling apparatus according to the exemplary embodiment will be described, and thereby the method for producing a three-dimensional modeled article according to the exemplary embodiment will also be described together.

An example of the three-dimensional modeling apparatus according to the exemplary embodiment will be shown below in FIG. 1, but the configuration of the three-dimensional modeling apparatus is not limited thereto as long as three-dimensional modeling is possible, and some of the members may be omitted and separate members may be added thereto.

Figure 1:
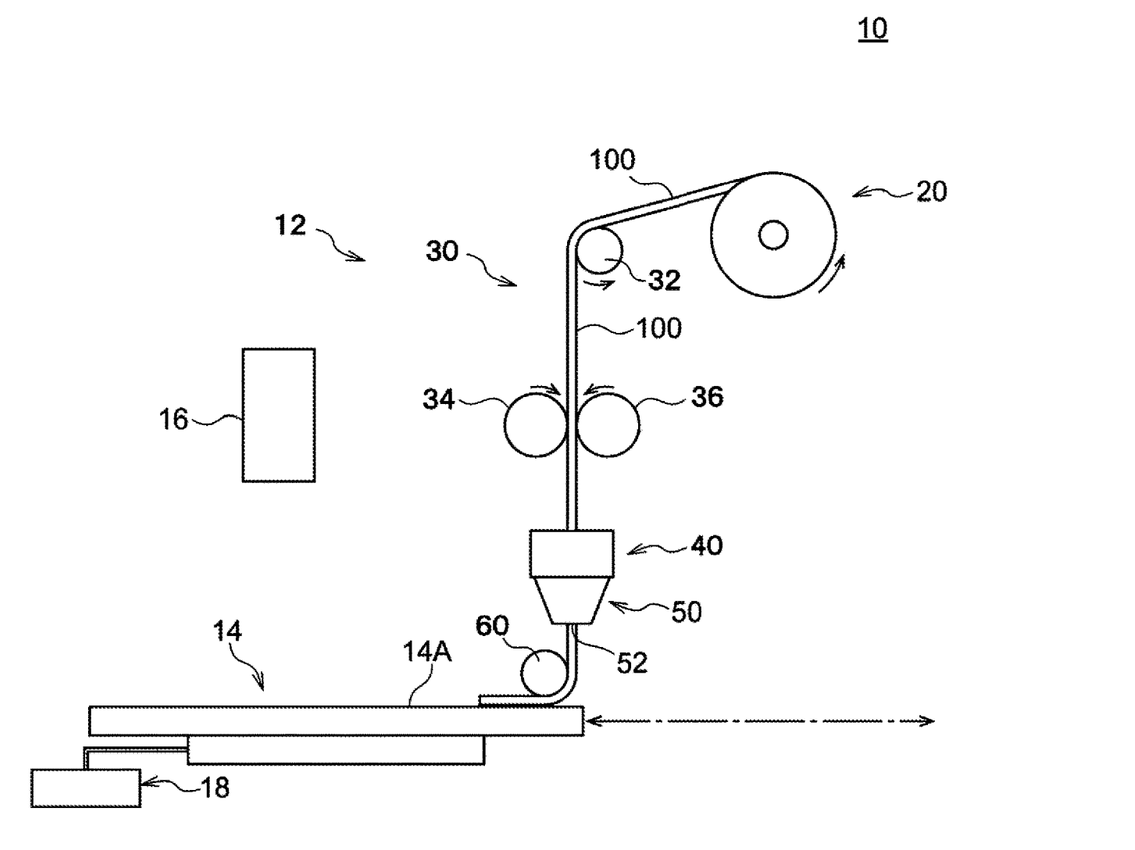
FIG. 1 shows a schematic view of an example of a three-dimensional modeling apparatus according to the exemplary embodiment.

FIG. 1 shows a schematic view of the example of the three-dimensional modeling apparatus according to the exemplary embodiment.

A three-dimensional modeling apparatus 10 shown in FIG. 1 includes a modeling unit 12, a table 14, a moving mechanism 18, and a control portion 16.

A filament 100 used in the three-dimensional modeling apparatus 10 is the filament according to the exemplary embodiment.

(Modeling Unit 12)

As shown in FIG. 1, the modeling unit 12 includes a storing portion 20 configured to store the filament 100, a feed portion 30 configured to feed the filament 100, a heating portion (an example of a heating unit) 40 configured to heat the filament 100, a discharge portion (an example of a discharge unit) 50 configured to discharge the filament 100, and a pressure roll 60.

In the storing portion 20, the filament 100 is stored in a state of being wound in a reeled shape.

The filament 100 stored in the storing portion 20 is rotated in the arrow direction and is send to a winding roll 32 in the feed portion 30.

The feed portion 30 includes the feed roll 32 and a pair of feed rolls 34 and 36 and feeds the filament 100 to the heating portion 40 from the storing portion 20.

As shown in FIG. 1, the filament 100 is wound around the winding roll 32 in the feed portion 30. The filament 100 is wound around the winding roll 32 and thereby fed in a feeding direction changed downward (specifically, the direction of gravitational force) as shown in FIG. 1.

The pair of feed rolls 34 and 36 are disposed downstream of the winding roll 32 in the feeding direction of the filament 100.

The feed roll 34 is disposed on a side opposite to the feed roll 36 across the filament 100, and the feed roll 34 and the feed roll 36 respectively rotate in the arrow directions to sandwich and feed the filament 100.

The pair of feed rolls 34 and 36 may have a heating portion configured to heat the filament 100.

The heating portion 40 heats the filament 100 conveyed from the feed portion 30.

The heating portion 40 is disposed downstream of the pair of feed rolls 34 and 36 in the feeding direction of the filament 100.

The heating portion 40 has a through hole through which the filament 100 passes, and the filament is heated while the filament 100 passes through the through hole, which is heated with a heating unit (not shown) provided in the heating portion.

An example of the heating unit is a heater in which a heating wire, a halogen lamp, or the like is used.

The heating temperature of the filament 100 depends on the kind or the like of the filament 100 and is preferably from 100° C. to 300° C. (preferably from 180° C. to 280° C.).

The discharge portion 50 discharges the filament 100 heated by the heating portion 40 onto the table 14.

The discharge portion 50 is disposed downstream of the heating portion 40 in the feeding direction of the filament 100 in a state of being connected to the heating portion 40.

The discharge portion 50 has a through hole continuous from the through hole in the heating portion 40 and discharges the filament 100, which has passed through this through hole, to a surface 14A of the table 14 from a discharge port 52.

The discharge portion 50 may have a heating unit configured to heat the through hole.

The pressure roll 60 pressurizes the filament 100 discharged from the discharge portion 50.

Specifically, the pressure roll 60 presses the filament 100 against the surface 14A of the table 14 and thereby sandwiches and pressurizes the filament 100 with the table 14. The pressure roll 60 pressurizes the filament 100, whereby the height of the filament 100 discharged onto the table 14 is made uniform.

The pressure roll 60 may have a heating unit configured to heat the filament 100.

(Table 14)

The table 14 is an example of a body onto which the filament 100 is discharged.

The table 14 is disposed below the modeling unit 12 as shown in FIG. 1.

The table 14 has the surface 14A, which is a horizontal surface. The filament 100 is discharged onto the surface 14A, and a laminate of the filament 100 is formed, thereby modeling a three-dimensional modeled article.

(Moving Mechanism 18)

The moving mechanism 18 is a mechanism configured to move the table 14 to, for example, any position in the device vertical direction, the device width direction, and the device depth direction.

As the moving mechanism 18, it is possible to use, for example, a triaxial robot capable of moving the table 14 to any position in the device vertical direction, the device width direction, and the device depth direction.

(Control Portion 16)

The control portion 16 controls the individual portions of the three-dimensional modeling apparatus 10.

Specifically, the control portion 16 has a storage portion including ROM (ROM) or a storage, in which a program is stored, and a processor configured to operate according to the program. The control portion reads and executes the program stored in the storage portion, thereby controlling the operations of the individual portions of the three-dimensional modeling apparatus 10.

The control portion 16 controls the operations of the individual portions of the three-dimensional modeling apparatus 10 based on a plurality of layer data produced from the three-dimensional data of a three-dimensional modeled article intended to be modeled such that the following modeling operations are executed.

EXAMPLES

Hereinafter, the present invention will be specifically described using examples, but the present invention is not limited to these examples.

Examples A1 to A12, Examples B1 to B14, and Comparative Examples 1 to 5

With respect to each of the working examples, the components according to Tables 1 to 3 (the numerical values in the tables indicate 'parts by number') are kneaded with an extruder (LABTECH ENGINEERING; biaxial, φ: 20 mm) to obtain polymer alloy pellets.

Subsequently, a carbon fiber (also referred to as CF, TORAYCA T300-6000 by Toray Industries, Inc.) and the above-described polymer alloy pellets are put into a bench for resin impregnation having a spreading mechanism and a resin melting tank, and the carbon fiber is impregnated with the resins such that the fiber volume content reaches 40%, thereby producing a filament with φ0.6 mm.

The obtained filament is stored in a three-dimensional modeling apparatus as shown in FIG. 1, and an ISO multipurpose dumbbell test piece is modeled under the following conditions.

The details of the three-dimensional modeling apparatus are as described below.

In the three-dimensional modeling apparatus, four guide pipes tailored for the filament diameter are disposed as a head tip (discharge portion 50). The filament is heated with an IR heater from above the guide pipes (heating portion 40) and sent to below a pressure roll (pressure roll 60). A pressure is applied to the filament to form a laminate. In addition, the three-dimensional modeling apparatus has a mechanism for adjusting the sending rate of the filament and controls the discharge rate of the filament. The modeling unit as described above is installed on a table top-type robot (Table Top TTAC) by IAI Corporation, thereby providing a three-dimensional modeling apparatus.

(Conditions for Modeling)

Filament heating temperature: 275° C.

Pressure applied to filament: 3.2 kg/cm²

The ISO multipurpose dumbbell test piece is a test piece for the ISO178 bending test, and the dimensions of a measurement portion are set to 10 mm in width and to 4 mm in thickness.

—Bending Elastic Modulus—

The bending elastic modulus of the obtained ISO multipurpose dumbbell test piece is measured by a method based on ISO178 using a universal testing device (AUTOGRAPH AG-Xplus manufactured by Shimadzu Corporation).

In addition, the obtained ISO multipurpose dumbbell test piece is immersed in water at 80° C. for 24 hours, and then moisture on the surface is wiped off. For the ISO multipurpose dumbbell test piece, the bending elastic modulus is measured in the same manner as described above.

The results are shown in Tables 1 to 3.

TABLE 1

| | | Example A1 | Example A2 | Example A3 | Example A4 | Example A5 | Example A6 | Example A7 |
|---|---|---|---|---|---|---|---|---|
| Component [parts by mass] | Fiber | Carbon fiber 50 | Carbon fiber 50 | Glass fiber 50 | Glass fiber 50 | Carbon fiber 50 | Carbon fiber 50 | Carbon fiber 50 |
| | First resin | PP 38 | PE 38 | PP 38 | PE 38 | PP 26 | PE 26 | PP 23 |
| | Second resin | PA6 10 | PA6 10 | PA66 10 | PA66 10 | PA6 20 | PA6 20 | PA66 22 |
| | Compatibilizing agent | Maleic PP 2 | Maleic PP 2 | Maleic PP 2 | Maleic PP 2 | Maleic PP 4 | Maleic PP 4 | Maleic PP 5 |
| Observation and evaluation | Sea-island structure | Present | Present | Present | Present | Present | Present | Present |
| | Resin included in sea part | PP | PE | PP | PE | PP | PE | PP |
| | Resin included in island part | PA6 | PA6 | PA66 | PA66 | PA6 | PA6 | PA66 |
| | S2/S1 × 100[%] | 18 | 17 | 17 | 16 | 39 | 38 | 42 |

TABLE 1-continued

|  |  |  |  |  |  |  |  |
|---|---|---|---|---|---|---|---|
| Diameter of island part [μm] | 7 | 7 | 6 | 6 | 6 | 6 | 5 |
| Bending elastic modulus [GPa] | 35 | 34 | 16 | 15 | 40 | 38 | 42 |
| Bending elastic modulus after immersion in water [GPa] | 32 | 31 | 14 | 13 | 34 | 33 | 35 |

|  |  |  | Example A8 | Example A9 | Example A10 | Example A11 | Example A12 |
|---|---|---|---|---|---|---|---|
| Component [parts by mass] |  | Fiber | Carbon fiber 50 | Carbon fiber 50 | Carbon fiber 50 | Carbon fiber 50 | Short fiber 30 |
|  |  | First resin | PE 23 | PP 38 | PP 38 | PP 38 | PP 37 |
|  |  | Second resin | PA66 22 | PBT 10 | PPS 10 | PES 10 | PA6 30 |
|  |  | Compatibilizing agent | Maleic PP 5 | Maleic PP 2 | Maleic PP 2 | Maleic PP 2 | Maleic PP 3 |
| Observation and evaluation |  | Sea-island structure | Present | Present | Present | Present | Present |
|  |  | Resin included in sea part | PE | PP | PP | PP | PP |
|  |  | Resin included in island part | PA66 | BT | PPS | PES | PA6 |
|  |  | S2/S1 × 100[%] | 42 | 14 | 14 | 14 | 40 |
|  |  | Diameter of island part [μm] | 5 | 7 | 7 | 7 | 4 |
|  |  | Bending elastic modulus [GPa] | 40 | 37 | 37 | 37 | 24 |
|  |  | Bending elastic modulus after immersion in water [GPa] | 34 | 32 | 32 | 32 | 21 |

TABLE 2

| | | Example B1 | Example B2 | Example B3 | Example B4 | Example B5 | Example B6 | Example B7 | Example B8 | Example B9 | Example B10 | Example B11 | Example B12 | Example B13 | Example B14 |
|---|---|---|---|---|---|---|---|---|---|---|---|---|---|---|---|
| Component [parts by mass] | Fiber | Carbon fiber 50 | Carbon fiber 50 | Glass fiber 50 | Glass fiber 50 | Carbon fiber 50 | Carbon fiber 50 | Carbon fiber 50 | Carbon fiber 50 | Carbon fiber 50 | Carbon fiber 50 | Carbon fiber 50 | Short fiber 30 | Carbon fiber 50 | Carbon fiber 50 |
| | First resin | PA6 38 | PA6 38 | PA66 38 | PA66 38 | PA6 26 | PA6 26 | PA66 23 | PA66 23 | PBT 38 | PPS 38 | PES 38 | PA6 37 | PA6 37 | PA6 37 |
| | Second resin | PP 10 | PE 10 | PP 10 | PE 10 | PP 20 | PE 20 | PP 22 | PE 22 | PP 10 | PP 10 | PP 10 | PP 30 | PP 10 | PE 10 |
| | Compatibilizing agent | Maleic PP 2 | Maleic PP 2 | Maleic PP 2 | Maleic PP 2 | Maleic PP 4 | Maleic PP 4 | Maleic PP 5 | Maleic PP 5 | Maleic PP 2 | Maleic PP 2 | Maleic PP 2 | Maleic PP 3 | ipp-PAA 3 | ipp-PAA 3 |
| Observation and evaluation | Sea-island structure | Present | Present | Present | Present | Present | Present | Present | Present | Present | Present | Present | Present | Present | Present |
| | Resin included in sea part | PA6 | PA6 | PA66 | PA66 | PA6 | PA6 | PA66 | PA66 | PBT | PPS | PES | PA6 | PA6 | PA6 |
| | Resin included in island part | PP | PE | PP | PE | PP | PE | PP | PE | PP | PP | PP | PP | PP | PE |
| | S2/S1 × 100[%] | 18 | 17 | 17 | 16 | 39 | 38 | 42 | 42 | 14 | 14 | 14 | 40 | 18 | 17 |
| | Diameter of island part [μm] | 7 | 7 | 6 | 6 | 6 | 6 | 5 | 5 | 7 | 7 | 7 | 4 | 7 | 7 |
| | Bending elastic modulus [GPa] | 45 | 44 | 27 | 28 | 43 | 42 | 40 | 39 | 46 | 48 | 49 | 31 | 44 | 43 |
| | Bending elastic modulus after immersion in water [GPa] | 34 | 34 | 18 | 17 | 36 | 37 | 35 | 35 | 40 | 42 | 44 | 22 | 33 | 32 |

TABLE 3

|  |  | Comparative Example 1 | Comparative Example 2 | Comparative Example 3 | Comparative Example 4 | Comparative Example 5 |
|---|---|---|---|---|---|---|
| Component [parts by mass] | Fiber | Carbon fiber 50 | Carbon fiber 50 | Glass fiber 50 | Carbon fiber 50 | Short fiber 50 |
|  | First resin | PP 30 | PP 30 | PE 30 | — | PP 30 |
|  | Second resin | — | PA6 20 | — | PA6 30 | — |
|  | Compatibilizing agent | Maleic PP 20 | — | Maleic PP 20 | Maleic PP 20 | Maleic PP 20 |
| Observation and evaluation | Sea-island structure | Absent | Present | Absent | Absent | Absent |
|  | Resin included in sea part | — | PP | — | — | — |
|  | Resin included in island part | — | PA6 | — | — | — |
|  | S2/S1 × 100[%] | — | 39 | — | — | — |
|  | Diameter of island part [µm] | — | 42 | — | — | — |
|  | Bending elastic modulus [GPa] | 25 | 26 | 10 | 46 | 12 |
|  | Bending elastic modulus after immersion in water [GPa] | 22 | 24 | 8 | 29 | 10 |

The details of the individual components used in Tables 1 to 3 are as described below.

—Fiber—

Carbon fiber (continuous fiber, TORAYCA (registered trademark) T300-6000, Toray Industries, Inc.)

Glass fiber (continuous fiber, ROVING RS240 PG-633, Nitto Boseki Co., Ltd.)

Short fiber (carbon fiber, TORAYCA (registered trademark) cut fiber T008, Toray Industries, Inc.)

—First Resin—

PP: Polypropylene (NOVATECH (registered trademark) PP MA3, Japan Polypropylene Corporation; melting point 165° C.)

PE: Polyethylene (ULTZEX 20100J, Prime Polymer Co., Ltd.; melting point 120° C.)

—Second Resin—

PA6: Specific resin a (Nylon 6, ZYTEL (registered trademark) 7331J, Dupont; melting point 225° C.)

PA66: Specific resin a (Nylon 66, ZYTEL (registered trademark) 101L, Dupont; melting point 262° C.)

PBT: Specific resin b (polybutylene terephthalate, Mitsubishi Engineering-Plastics Corporation; melting point 232° C.)

PPS: Specific resin c (polyphenylene sulfide, FZ-2100, DIC Corporation; melting point 278° C.)

PES: Specific resin c (polyethersulfone, SUMIKAEXCEL, 3600 Sumitomo Chemical Co., Ltd.; melting point 288° C.)

—Compatibilizing Agent—

Maleic PP: Maleic anhydride-modified polypropylene (UMEX (registered trademark) 110TS manufactured by Sanyo Chemical Industries, Ltd.

iPP-PAA: Ternary block copolymer of polyacrylic acid-isotactic polypropylene-polyacrylic acid (Mn: 4000-23000-4000, San-ei Kogyo Corp.)

From the above-described results, it is found that three-dimensional modeled articles having a high bending elastic modulus may be obtained from the filaments of the examples compared with the comparative examples as long as the same fibers are used.

In addition, it is found that the three-dimensional modeled articles obtained from the filaments of the examples are excellent in terms of bending elastic modulus even after being immersed in water, and the degree of the bending elastic modulus changed before and after the immersion in water is small. This is assumed to be because the polyamide, which is highly polar, is used in combination with the polyolefin, and thus the hygroscopicity of the three-dimensional modeled articles is suppressed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A filament for three-dimensional modeling, comprising
    a first resin and a second resin having a difference in solubility parameter of 5 or more;
    a fiber; and
    a compatibilizing agent, and
    having a sea-island structure including a sea part and island parts, the sea part including the first resin and the island parts including the second resin,
    wherein:
        at least a part of the island part coats at least a part of a surface of the fiber,
        in a cross section of the filament in a direction orthogonal to a longitudinal axis of the filament, the island parts have a diameter of 0.1 µm or more and 20 µm or less, and
        S2/S1×100 is 5% or more and 49% or less, where:
            S1 represents an area obtained by subtracting an area occupied by the fiber from a total area of a cross section of the filament in a direction orthogonal to a longitudinal axis of the filament, and
            S2 represents a total area of the island parts in the cross section.

2. The filament for three-dimensional modeling according to claim 1,
wherein the S2/S1×100 is 10% or more and 40% or less.

3. The filament for three-dimensional modeling according to claim 1,
wherein the island parts have a diameter of 1 μm or more and 10 μm or less.

4. The filament for three-dimensional modeling according to claim 1,
wherein a melting temperature of the first resin included in the sea part is lower than a melting temperature of the second resin included in the island parts.

5. The filament for three-dimensional modeling according to claim 1, wherein:
the first resin is formed of a polyolefin, and
the second resin is selected from the group consisting of a resin having at least one of an amide bond and an imide bond, a resin having an ester bond, and a resin having a bonding group including sulfur.

6. The filament for three-dimensional modeling according to claim 5,
wherein the compatibilizing agent is at least one kind selected from the group consisting of a polyolefin having a modified branch and a polyolefin having a modified main chain terminal.

7. The filament for three-dimensional modeling according to claim 1,
wherein the fiber is a continuous fiber.

8. The filament for three-dimensional modeling according to claim 1, wherein a difference in melting temperature between the first resin in the sea part and the second resin in the island parts is 20° C. or more and 300° C. or less.

9. The filament for three-dimensional modeling according to claim 1, wherein a difference in solubility parameter between the first resin in the sea part and the second resin in the island parts is 5 or more and 10 or less.

10. The filament for three-dimensional modeling according to claim 1, wherein:
the first resin is formed of a polyolefin other than polypropylene and
the second resin is selected from the group consisting of a resin having at least one of an amide bond and an imide bond, a resin having an ester bond, and a resin having a bonding group including sulfur.

11. A filament for three-dimensional modeling,
comprising
a first resin and a second resin having a difference in solubility parameter of 5 or more;
a fiber selected from the group consisting of a carbon fiber, a glass fiber, a metal fiber, and an aramid fiber; and
a compatibilizing agent, and
having a sea-island structure including a sea part and island parts, the sea part including the first resin and the island parts including the second resin,
wherein:
at least a part of the island part coats at least a part of a surface of the fiber, and
S2/S1×100 is 5% or more and 49% or less, where:
S1 represents an area obtained by subtracting an area occupied by the fiber from a total area of a cross section of the filament in a direction orthogonal to a longitudinal axis of the filament, and
S2 represents a total area of the island parts in the cross section.

12. A filament for three-dimensional modeling,
comprising
a first resin and a second resin having a difference in solubility parameter of 5 or more;
a fiber; and
a compatibilizing agent, and
having a sea-island structure including a sea part and island parts, the sea part including the first resin and the island parts including the second resin,
wherein:
at least a part of the island part coats at least a part of a surface of the fiber,
the filament has a diameter of about 0.6 mm, and
S2/S1×100 is 5% or more and 49% or less, where:
S1 represents an area obtained by subtracting an area occupied by the fiber from a total area of a cross section of the filament in a direction orthogonal to a longitudinal axis of the filament, and
S2 represents a total area of the island parts in the cross section.

\* \* \* \* \*